United States Patent [19]

Neal et al.

[11] Patent Number: 6,044,932
[45] Date of Patent: Apr. 4, 2000

[54] ERGONOMIC PARTS BIN ELEVATOR WITH INTEGRAL SPRINGS

[75] Inventors: Matthew Zane Neal; Dennis Richard Weber, both of Mansfield, Ohio

[73] Assignee: Ergonomics Specialists, Mansfield, Ohio

[21] Appl. No.: 09/332,748

[22] Filed: Jun. 14, 1999

Related U.S. Application Data

[62] Division of application No. 08/401,402, Mar. 9, 1995, Pat. No. 5,626,206.

[51] Int. Cl.[7] ..................................................... H63L 4/00
[52] U.S. Cl. ............................................. 187/244; 108/136
[58] Field of Search ..................................... 187/240, 244, 187/222, 233; 108/136; 312/42, 71

[56] References Cited

U.S. PATENT DOCUMENTS

| | | | |
|---|---|---|---|
| Re. 28,311 | 1/1975 | Cummings | 312/71 |
| 2,306,385 | 12/1942 | Herter | 62/89.5 |
| 2,468,115 | 4/1949 | Saul, Jr. | 220/93 |
| 2,626,727 | 1/1953 | Gibbs et al. | 220/93 |
| 2,649,992 | 8/1953 | Bockius | 220/93 |
| 2,662,802 | 12/1953 | Gibbs | 312/71 |
| 2,692,177 | 10/1954 | Larsen | 312/71 |
| 2,709,561 | 5/1955 | Shelley | 248/204 |
| 2,717,085 | 9/1955 | Waddington | 211/74 |
| 2,773,604 | 12/1956 | Gruss | 211/49 |
| 2,812,104 | 11/1957 | Larsen | 220/93 |
| 2,928,639 | 3/1960 | Shelley | 248/204 |
| 3,276,830 | 10/1966 | Vorndran | 312/71 |
| 3,327,655 | 6/1967 | MacKay | 108/136 |
| 3,388,677 | 6/1968 | MacKay | 108/136 |
| 3,407,015 | 10/1968 | Silberberg | 312/71 |
| 3,418,031 | 12/1968 | Fisher | 312/319 |
| 3,511,548 | 5/1970 | McIlhone | 312/71 |
| 3,663,078 | 5/1972 | Moore et al. | 312/71 |
| 3,739,879 | 6/1973 | House | 187/24 |
| 3,747,733 | 7/1973 | Knickerbocker | 194/10 |
| 3,941,440 | 3/1976 | Menzin et al. | 312/71 |
| 4,009,915 | 3/1977 | Whitelaw et al. | 312/71 |
| 4,073,388 | 2/1978 | Carter | 214/8.5 |
| 4,161,146 | 7/1979 | Kooiman | 108/136 |
| 4,206,954 | 6/1980 | Kooiman | 312/71 |
| 4,357,127 | 11/1982 | Kooiman | 414/99 |
| 4,545,463 | 10/1985 | Olovsson | 187/9 |
| 4,867,277 | 9/1989 | Sloan | 187/9 |
| 5,199,600 | 4/1993 | Fietsam | 221/241 |
| 5,421,481 | 6/1995 | Fortmann et al. | 221/271 |
| 5,893,615 | 4/1999 | Hendricks | 312/71 |

*Primary Examiner*—Kenneth W. Noland
*Attorney, Agent, or Firm*—Emerson & Associates; Roger D. Emerson; Timothy D. Bennett

[57] ABSTRACT

A device for and method of ergonomically removing parts from a parts bin, so that an operator does not have to unnecessarily bend to remove parts, using an open-ended bin, a platform removably contained within the bin, and a mechanism for lifting the platform which is, also, removably contained within the bin. The mechanism for lifting the platform may be a manually operated or automatically operated scissor-type jack, hydraulic cylinder, or pneumatic cylinder. Also, the platform may be vertically adjusted by a spring whose spring constant is chosen to correspond to the weight of the parts within the bin.

5 Claims, 18 Drawing Sheets

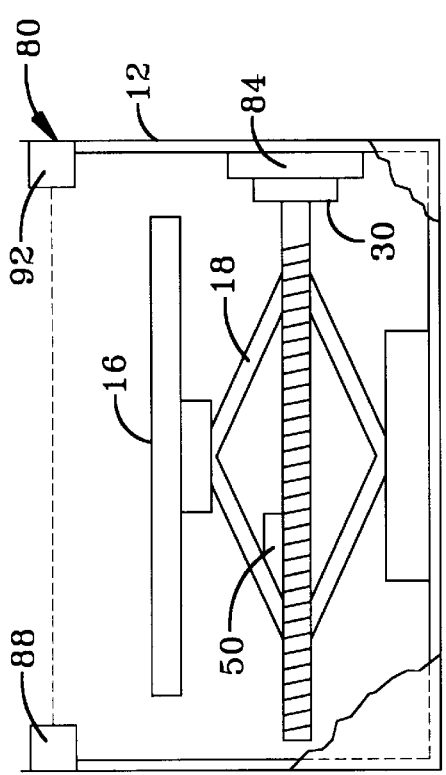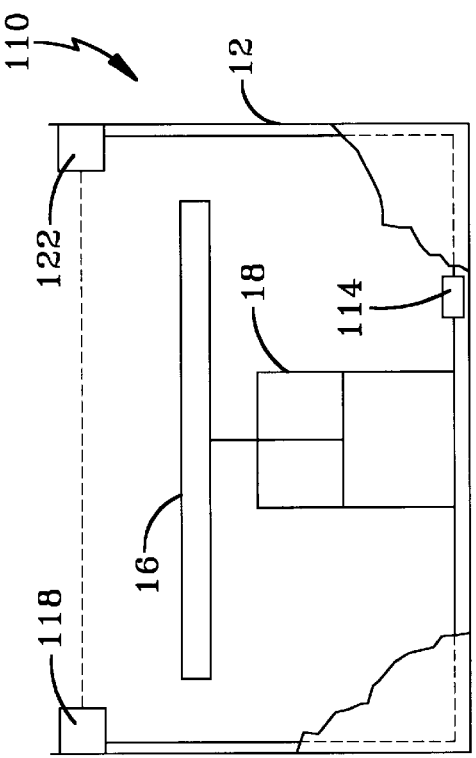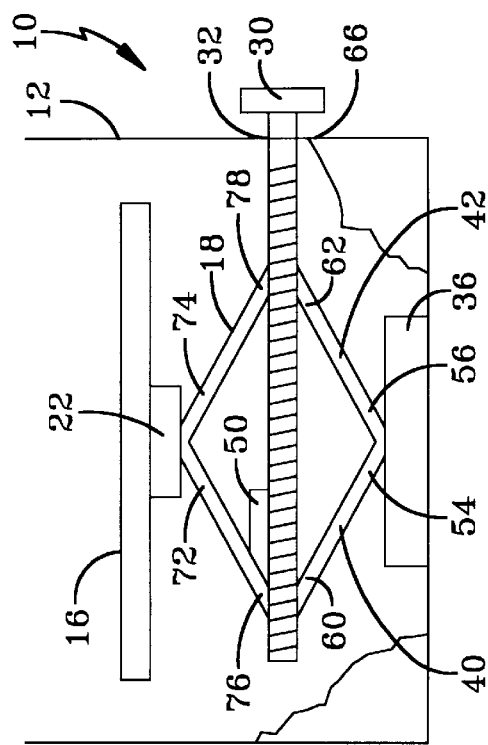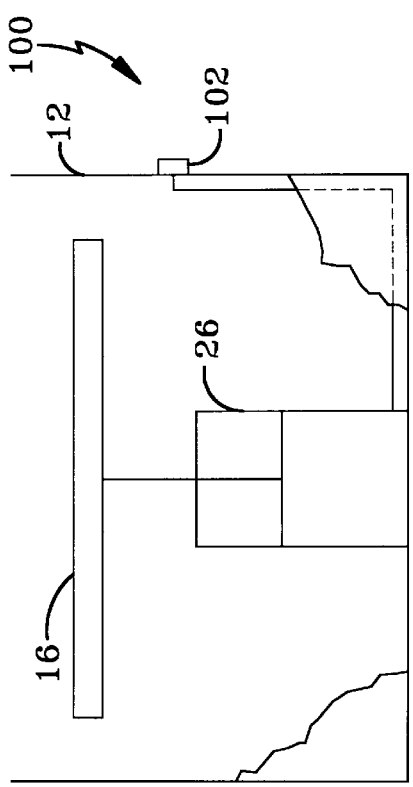

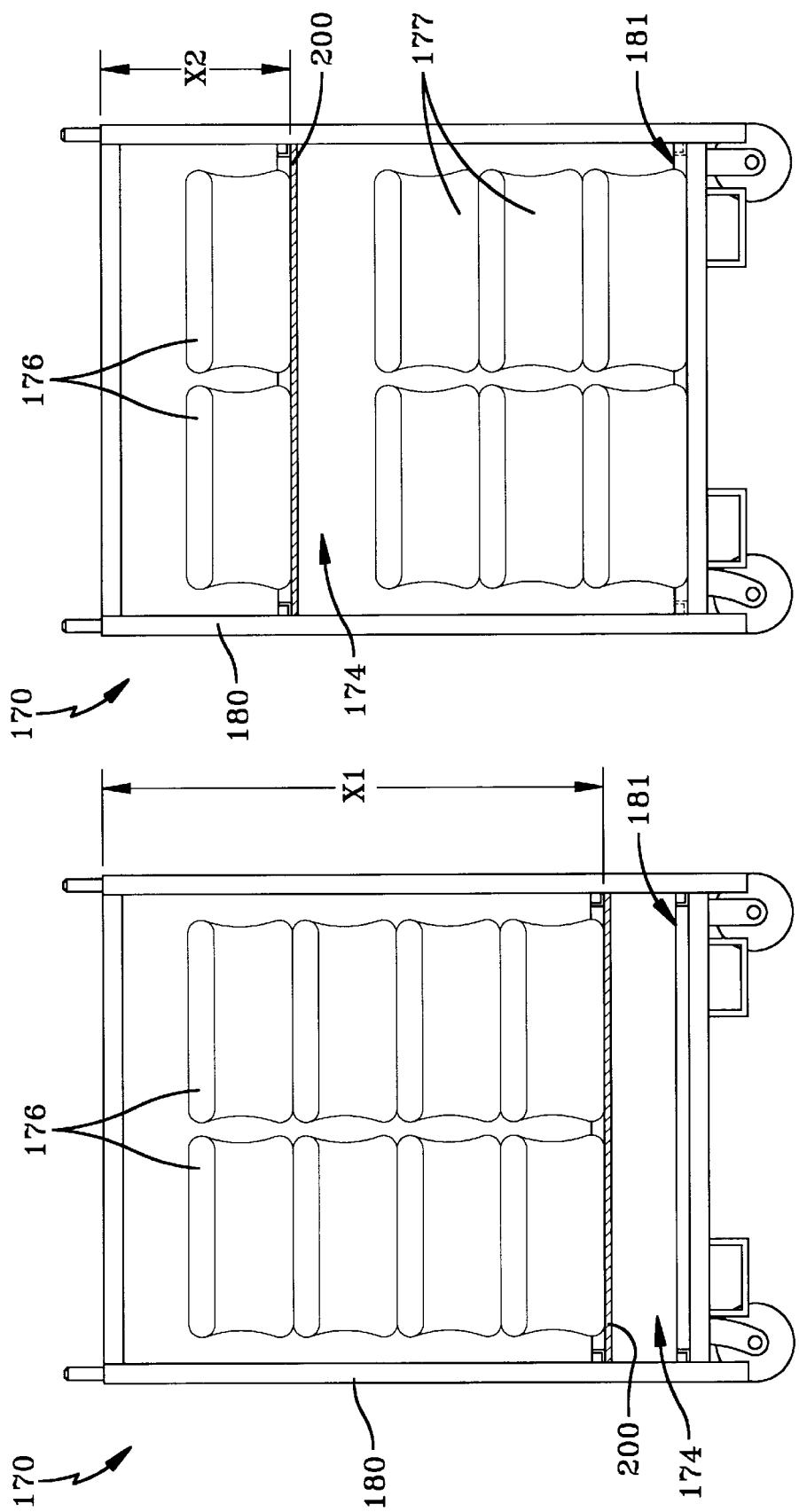

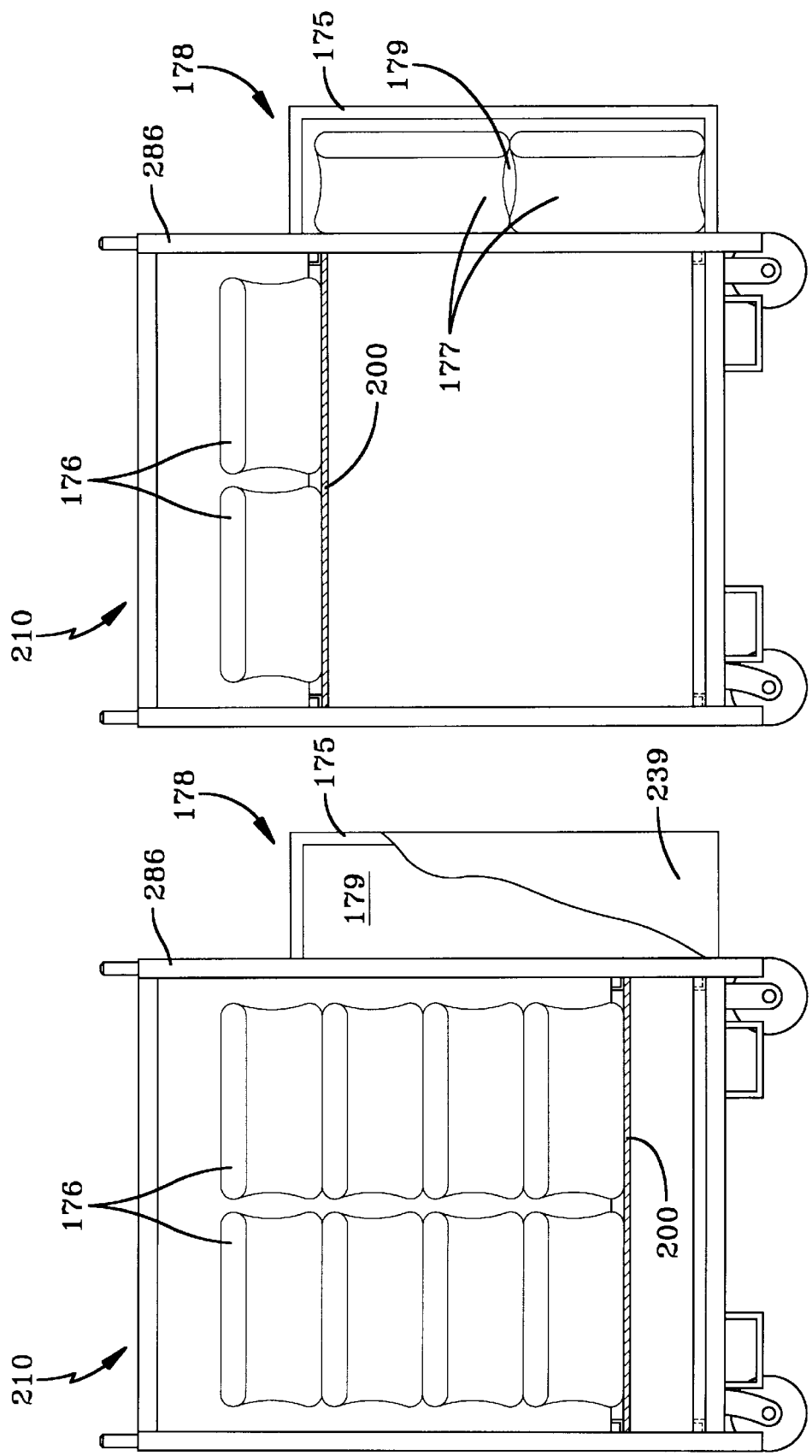

ERGONOMIC PARTS BIN ELEVATOR WITH INTEGRAL SPRINGS

This Application is a Divisional of U.S. patent application Ser. No. 08/401,402, filed Mar. 9, 1995, now U.S. Pat. No. 5,626,206.

BACKGROUND OF THE INVENTION

1. Field of Invention

The present invention pertains to a vertical adjustment mechanism and, more particularly, to a vertical adjustment mechanism which can be mounted within or inserted into a parts bin in order to vertically adjust parts in the bin to eliminate unnecessary bending or movement by a human who must remove parts from the bin.

2. Description of the Related Art

It is known to provide a vertical adjustment mechanism for maintaining parts at a vertical position within a parts bin.

A problem commonly encountered in the art deals with a reliable means for maintaining a platform, which holds the parts, at a required vertical position when parts are removed or added.

Another problem encountered in the art deals with the position of the lifting means used to lift the platform. Typically, the lifting means is positioned directly below the platform. Such positioning does not take full advantage of the space under the platform.

Another problem encountered in the art deals with the stability of the apparatus. Often the platform is connected to the lifting means and the parts bin in only one or a few places.

The present invention provides methods and apparatuses for reducing these problems. The difficulties inherent in the art are therefore overcome in a way which is simple and efficient, while providing better and more advantageous results.

SUMMARY OF THE INVENTION

It is an object of the present invention to eliminate injuries caused by bending to remove parts from a parts bin.

It is another object of the present invention to disclose a device for and a method of vertically adjusting parts in a parts bin to minimize the bending required to remove a part from the parts bin.

It is another object of the present invention to disclose a device for and method of adjusting the height of parts in a parts bin that is under the control of an human operator.

It is another object of the present invention to disclose a device for and method of vertically adjusting the height of parts in a parts bin that is under the control of an electronic device.

It is another object of the present invention to disclose a device for and method of vertically adjusting parts in a parts bin by a mechanical, hydraulic, or pneumatic mechanism.

It is another object of the present invention to disclose a device for and method of vertically adjusting parts in a parts bin that is portable.

It is another object of the present invention to disclose a device for and method of vertically adjusting parts in a parts bin that is removable from the parts bin.

It is another object of the present invention to disclose a device for and a method of vertically adjusting parts in a parts bin that fits into any size parts bin and vertically adjusts parts of any size or weight.

It is another object of the present invention to disclose a device for and method of vertically adjusting parts in a parts bin that is strong, lightweight, long-lasting, economic, and ergonomic.

It is another object of the present invention to disclose a device for and method of vertically adjusting parts in a parts bin using a spring having a spring constant chosen and matched to the weight of the parts stored in the parts bin.

It is another object of the present invention to disclose a device for and method of vertically adjusting parts in a parts bin where the lifting means is located externally to the platform.

The objects of the present invention are realized by disclosing a device for and method of vertically adjusting parts in a parts bins to a level that minimizes the bending and movement required by a human operator to remove a part from the parts bin. It is believed that injuries would be avoided by eliminating unnecessary bending of the lower back, eliminating unnecessary pulling on the shoulders, eliminating unnecessary pulling on the upper back, and other similar movements.

The present invention discloses a device for and method of vertically adjusting parts in a parts bin that includes a mechanism for accepting input from an operator that results in a vertical adjustment that is under the control of the operator.

The present invention discloses a device for and method of vertically adjusting parts in a parts bin that includes an electronic device that vertically adjusts the parts in a parts bin without any input from an operator.

The present invention discloses a device for and method of vertically adjusting parts in a parts bin that utilizes either a mechanical, a hydraulic, and a pneumatic mechanism to vertically adjust the parts in a parts bin. Each of these means for lifting are either under the control of the operator or are controlled electronically or automatically, without any input from an operator.

The present invention discloses a device for and method of vertically adjusting parts in a parts bin that is portable or permanently mounted within the bin.

The lifting mechanism, and the electronic leveling device, when utilized, can be made to fit any size parts bin and level any type of part.

The present invention discloses a device for and method of vertically adjusting parts in a parts bin that is made of strong, lightweight, long-lasting, economic, and ergonomic materials such as polyethylene which will not rust, mildew or deteriorate, is easy to clean, and is impervious to moisture oils, and most chemical agents.

The present invention discloses a device for and method of vertically adjusting parts in a parts bin that uses a calibrated spring as a lifting means. The spring is calibrated or chosen to correspond to the weight of parts stored in the parts bin. The spring constant of the spring (the spring constant is "k" in the equation F=kx, where "F" equals the force supplied by the spring and "x" equals a spring displacement distance) is selected so that the weight of the parts removed will cause the platform to move through a distance "x". The distance "x" is also essentially equal to the height of parts being removed from the bin. The force ("F") supplied by the spring causes the platform to rise an height generally equal to the height of the parts removed. Through this mechanism, the spring keeps the parts at the proper height, so that an operator does not have to provide any input to keep the parts in the parts bin at the proper vertical adjustment.

Through the same mechanism, the ergonomic parts bin elevator of the present invention lowers the parts in the parts bins as additional parts are added to the parts bin in order to keep the parts in the parts bin at a vertical position that minimizes the bending required to remove a part from the parts bin. As parts are removed from the parts bin, the present invention raises the level of the parts in the parts bin so that the parts remaining in the parts bin maintain the vertical position that minimizes the bending required to remove a part from the parts bin.

The present invention can be made to be portable or stationary. It can be designed to fit into any existing parts bin. It can be made to vertically adjust to any type of part.

The present invention discloses a method for emptying parts from a platform truck. First parts are emptied from a parts container positioned on the platform of a platform truck. Next, the size of an open storage space under the platform is increased. Finally, the parts container is stored in the open storage space.

The advantages and benefits of the present invention are that bending is minimized, and therefore, injuries due to bending are reduced. Damage to parts is reduced, since fewer parts will be dropped due to the lower strain associated with the minimized bending of the present invention. The present invention is easy to use, can be automatic, and requires minimal maintenance.

Productivity is increased due to the reduced time and strain required to move parts in and out of the parts bin, and costs and expenses are minimized, due to a reduction in parts damage.

Another advantage of the present invention is that the space under the platform is usable for storage, dunnage or other purposes.

Still another advantage of the present invention is that the platform moves smoothly along guide rods with no binding. The linear bearings also eliminate any tipping factor.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein:

FIG. 1 is a cut-away schematic front view of a first embodiment of the present invention.

FIG. 2 is a cut-away schematic front view of a second embodiment of the present invention.

FIG. 3 is a cut-away schematic front view of a third embodiment of the present invention.

FIG. 4 is a cut-away schematic front view of a fourth embodiment of the present invention.

FIG. 13 is a front view of an ergonomic platform truck when it is fully loaded.

FIG. 14 is a front view of the ergonomic platform truck of FIG. 13 showing how the open storage space can be used to store empty parts containers.

FIG. 15 is a front view of an ergonomic platform truck which has a storage assembly mounted to the bin.

FIG. 16 is a front view of the ergonomic platform truck of FIG. 15 showing how the storage assembly can be used to store empty parts containers.

DESCRIPTION OF THE PREFERRED EMBODIMENT

Figure 5:
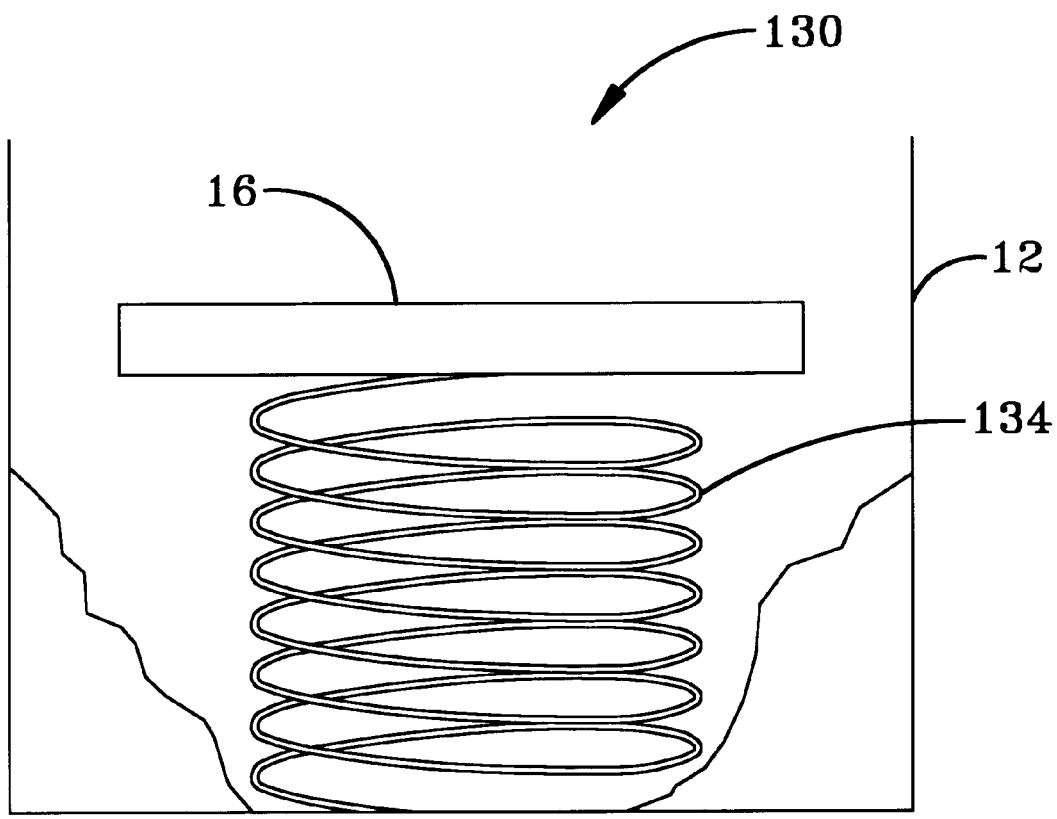
FIG. 5 is a cut-away schematic front view of a fifth embodiment of the present invention.

Referring now to the drawings wherein the showings are for purposes of illustrating a preferred embodiment of the invention only and not for purposes of limiting the same, the present invention is a device for and method of vertically adjusting parts in a parts bins to a level that minimizes the bending required of a human operator to remove a part from, or add parts to, the parts bin. FIG. 1 is a cut-away view of a first embodiment 10 of the present invention.

The first embodiment 10 of the present invention includes a parts bin 12 for holding parts (not shown) on a platform 16 for defining the lowest vertical position that a part can take in the parts bin 12, and a lifting mechanism 18 for vertically adjusting the platform 16 so that the parts in the parts bin 12 are always at a vertical position that minimizes the bending required of an operator to remove parts from, or add parts to, the parts bin 12. Platform 16 may be a container which is attached to the planar platform 16 or upper panel 22. Platform 16 can be permanently or removably attached to upper panel 22.

The lifting mechanism 18 for lifting the platform 16 can be realized in any one of a number of ways. One possible realization is a scissor-type jack 18 as depicted in FIG. 1. The scissor-type jack 18 shown in FIG. 1 has a crank 30 extending through an opening 32 in the parts bin 12. The crank 30 enables an operator to vertically adjust the level of the parts to a level that minimizes the bending required of an operator to remove parts from, or add parts to, the parts bin 12. The scissor-type jack 18 of FIG. 1 includes a pedestal 36, a first support member 40, a second support member 42, a third support member 44, a fourth support member 46, planar platform 16, a threaded bar 50, and a crank 30.

The first support member 40 and the second support member 42 are pivotally joined to the pedestal 36 at a first end 54, 56 respectively. A second end 60 of the first support member 40 and second end 62 of the second support member 42 each have a threaded hole (not shown). The threaded hole of the first support member 40 faces the threaded hole of the second support member 42 so that the threaded bar 50 can travel through these holes to adjust the distance between the first support member 40 and the second support member 42 and, therefore, the vertical position of the platform 16. The crank 30 is connected to a first end 66 of the threaded bar 50 and is used to adjust the distance between the first support member 40 and the second support member 42. The third support member 44 and the fourth support member 46 are pivotally joined to the upper panel 22 at their first ends 72, 74, respectively. The second end 76 of the third support member 44 and the second end 78 of the fourth support member 46 each have a threaded hole (not shown). The threaded hole of the third support member 44 faces the threaded hole of the fourth support member 46. The threaded hole end of the third support member 44 is pivotally joined to the threaded-hole end of the first support member 40 so that the threaded bar 50 can travel through these holes and adjust the vertical position of the upper panel 22 and, therefore, the platform 16. The threaded-hole end of the fourth support member 46 is pivotally joined to the threaded-hole end of the second support member 42 so that the threaded bar 50 can travel through these holes and adjust the vertical position of the upper panel 22 and, therefore, the platform 16. Vertically adjusting the upper panel 22 via the crank 30 results in the vertical adjustment of the platform 16 and the parts.

FIG. 2 depicts a second embodiment 80 of the present invention that is, essentially, the same as the device of FIG. 1 with the addition of electronics to automatically adjust the vertical position of the parts. In FIG. 2, the lifting mechanism 18 (e.g., a scissor-type jack) for vertically adjusting the parts, is fully contained within the parts bin 12. A motor 84 automatically turns the crank 30 of the scissor-type jack 18 in order to raise, or lower, the lifting mechanism 18. A light-emitting diode (LED) 88 is attached to the inside top of one of the walls of the parts bin 12. A photo-detector 92 is attached to the inside top wall of the parts bin 12 that is directly across from, and in the light path of, the light-emitting diode 88. The light-emitting diode 88 and the photo-detector 92 are electrically connected to the motor 84 so that the motor 84 will turn the crank 30 and vertically adjust the platform 16 and the parts, so that the light beam from the light-emitting diode 88 is just barely interrupted. Electronics (not shown) are contained within the motor 84 that turns the crank 30 so that the platform 16 is vertically adjusted to the point where the light beam from the light-emitting diode 88 is just interrupted. The electronics in the motor 84 will periodically raise, and lower, the platform 16 in order to check the position of the platform 16 to maintain the vertical position of the parts to a level that just barely interrupts the light from the light-emitting diode 88. This ensures that the vertical position of the platform 16 is lowered whenever parts are added to it. When parts are removed, the light from the light-emitting diode 88 is no longer interrupted. Photo-detector 92 then detects light emitted from the light-emitting diode 88 and signals the motor 84 to turn the crank 30 in order to raise the platform 16 and parts positioned thereon, so that the light from the light-emitting diode 88 is interrupted once again. This ensures that the parts in the parts bin 12 are always at the vertical position that minimizes the bending required of an operator to remove a part from, or add a part to, the parts bin 12.

FIG. 3 depicts the third embodiment 100 of the present invention that is, essentially, the same as the device of FIG. 1 with a different type of lifting mechanism (shown as 18 in FIG. 1). In FIG. 3, the lifting mechanism 26 can be either a hydraulic cylinder or a pneumatic cylinder. As in FIG. 1, the lifting mechanism 18 of FIG. 3 extends outside of the parts bin 12 so that an operator can provide an input via a control device 102 (e.g., a switch) to control the vertical position of the platform 16 and, therefore, the vertical position of the parts in the parts bin 12.

FIG. 4 depicts a fourth embodiment 110 of the present invention that is, essentially, the same as the device of FIG. 3 with the addition of electronics to automatically adjust the vertical position of the parts in the parts bin 12. In FIG. 4, the lifting mechanism 18 (i.e., either a hydraulic cylinder or a pneumatic cylinder) is fully contained within the parts bin 12. A motor 114 is added that automatically adjusts the vertical position of the lifting mechanism 18. A light-emitting diode 118 is attached to the inside top of one of the walls of the parts bin 12. A photo-detector 122 is attached to the inside top wall of the parts bin 12 that is directly across from, and in the light path of, the light-emitting diode 118. The light-emitting diode 118 and the photo-detector 122 are connected to the motor 114 so that the motor 114 will raise, or lower, the lifting mechanism 18 and, therefore, vertically adjust the platform 16 and the parts enough to just barely interrupt the light beam from the light-emitting diode 118 to the photo-detector 122. Electronics (not shown) are contained within the motor 114 to adjust the vertical position of the lifting mechanism 18 so that the platform 16 is vertically adjusted to the point where the light beam from the light-emitting diode 118 is just interrupted. The electronics in the motor 114 will periodically raise, and lower, the platform 16 in order to check the position of the parts. This ensures that the vertical position of the platform 16 is lowered whenever parts are added to the parts bin 12. When parts are removed from the parts bin 12, the light from the light-emitting diode 118 will no longer be interrupted and the photo-detector 122 will detect light emitted from the light-emitting diode 118 and signal the motor 114 to vertically adjust the lifting mechanism 18 in order to raise the platform 16 and parts positioned thereon, so that the light from the light-emitting diode 118 is interrupted once again. This ensures that the parts are always at the vertical position that minimizes the bending required of an operator to remove a part from, or add a part to, the parts bin 12.

Figure 6:
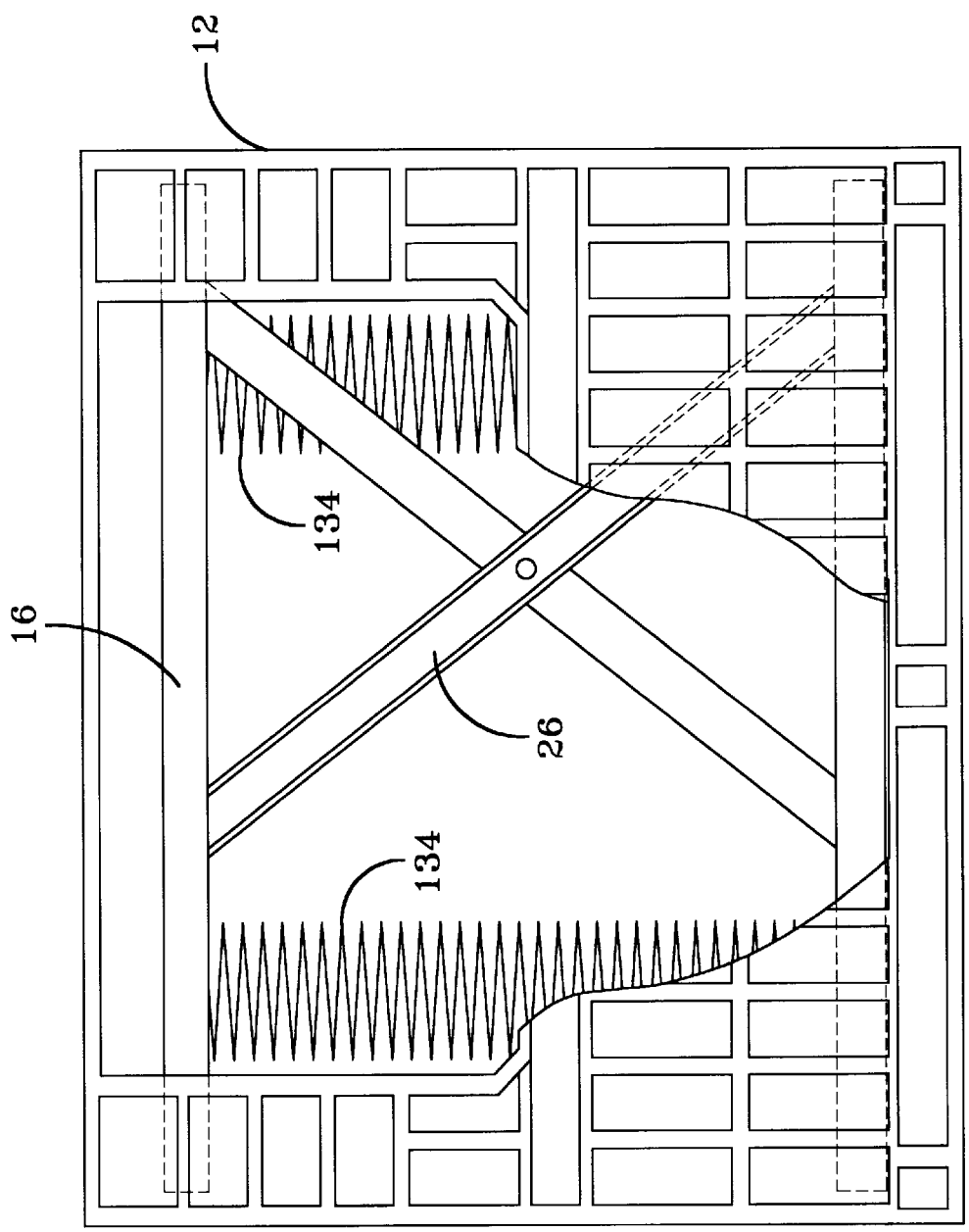
FIG. 6 is a cut-away front view of a bin according to the present invention.
Figure 7:
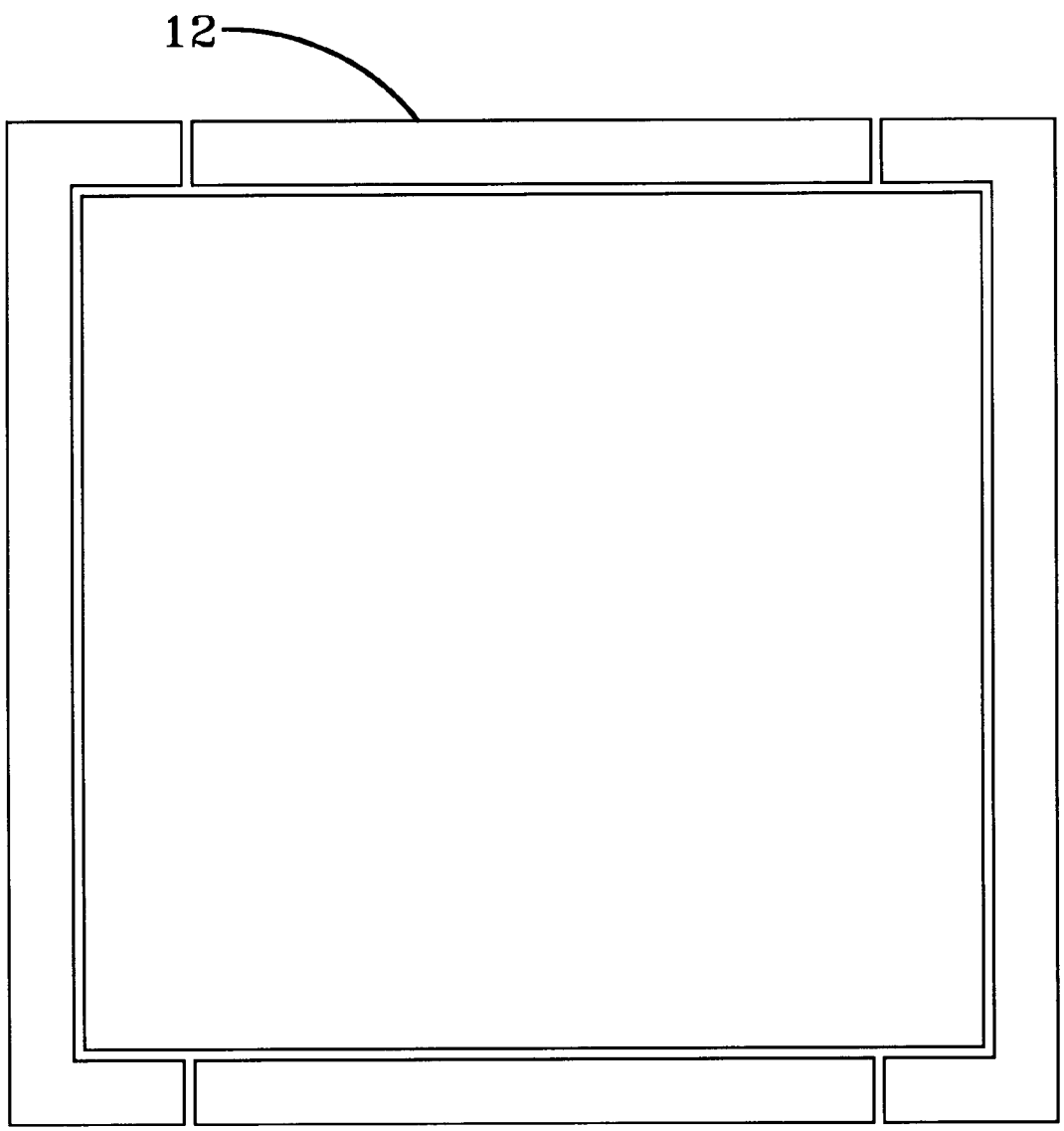
FIG. 7 is a cut-away top front view of the bin of FIG. 6 of the present invention.

FIGS. 5–7 show a fifth embodiment 130 of the present invention. The fifth embodiment 130 is, essentially, the same as the devices of FIGS. 2 and 4 with a different type of lifting mechanism. The lifting mechanism 26 of FIGS. 5–7 is a calibrated spring 134. The spring 134 must be calibrated for the type of part placed on platform 16 of the parts bin 12, so that the vertical position of the parts is always at the vertical position that minimizes the bending required of an operator when removing parts from, or adding parts to, the parts bin 12.

Figure 8:
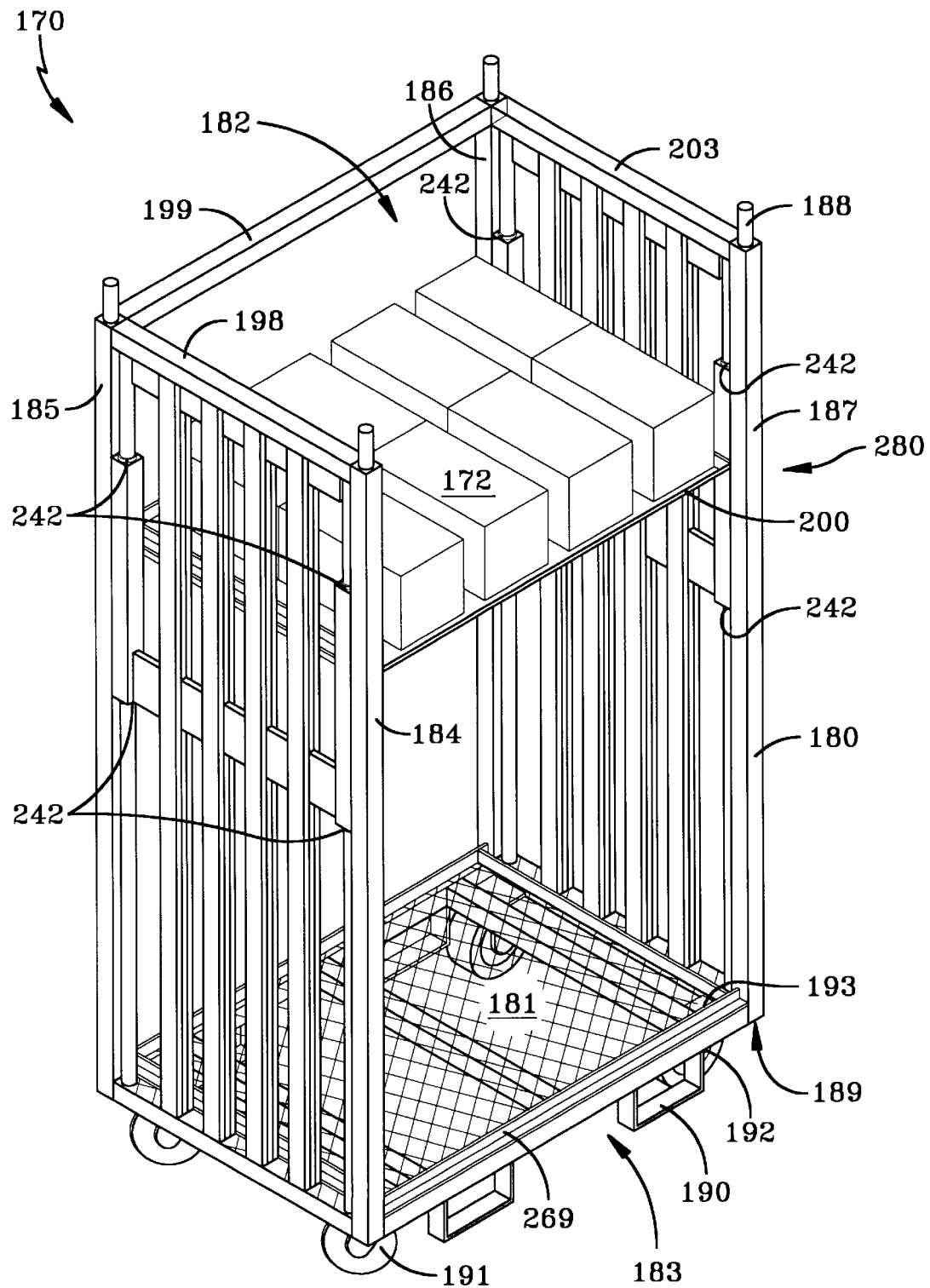
FIG. 8 is a perspective front view of a sixth embodiment of the present invention shown holding parts.
Figure 9:
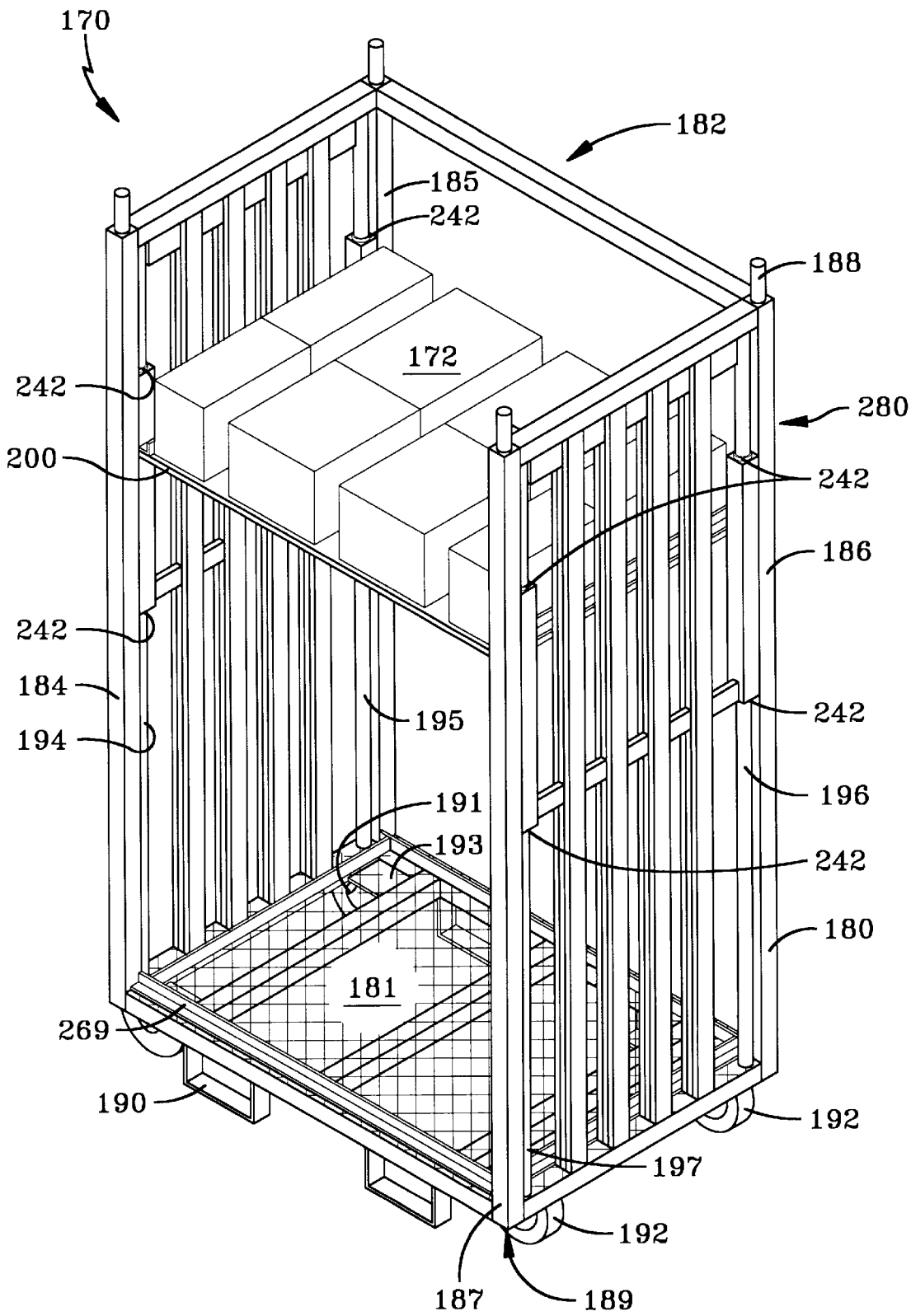
FIG. 9 is a perspective side view of the sixth embodiment shown holding parts.
Figure 10:
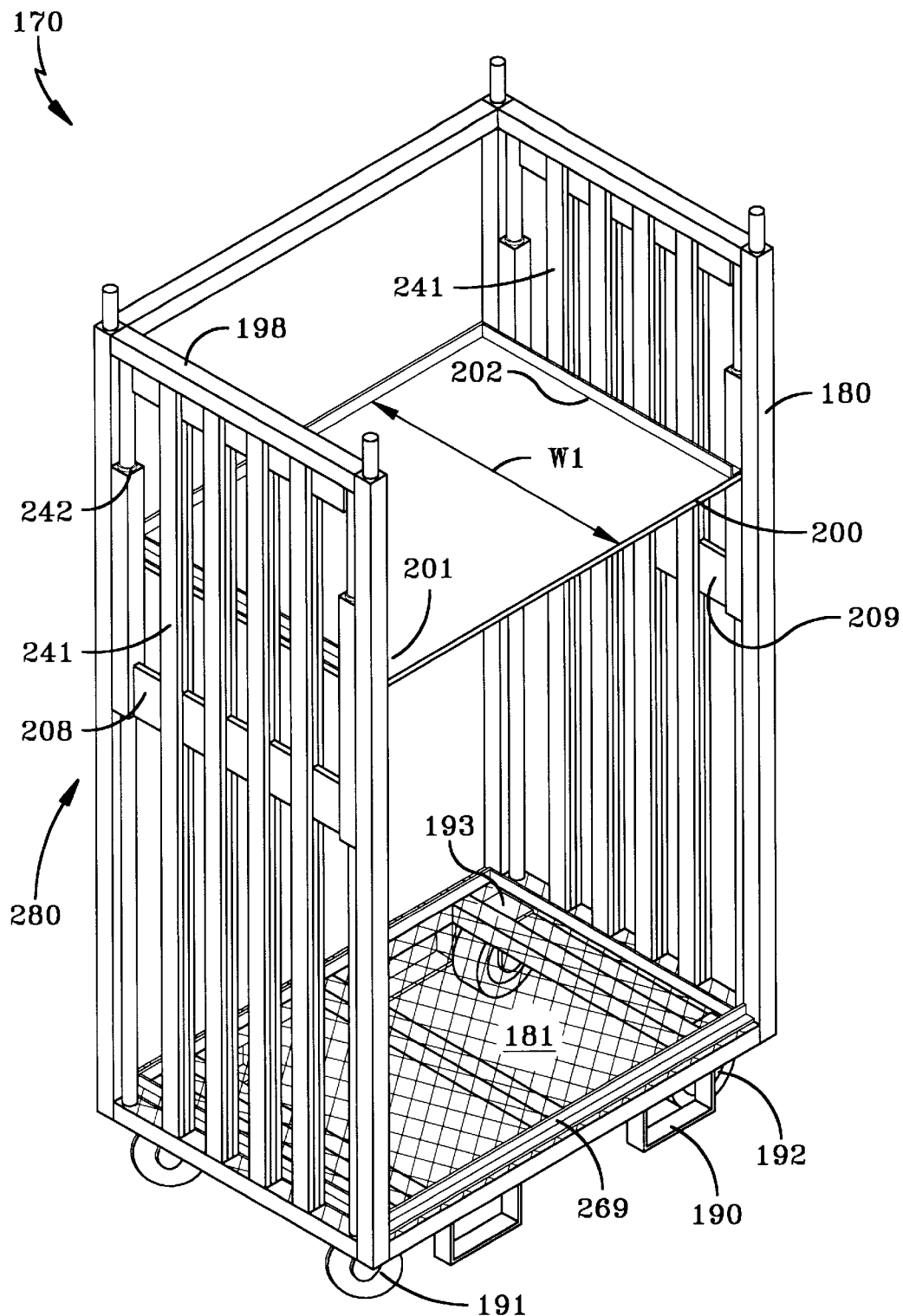
FIG. 10 is a perspective front view of the sixth embodiment shown without parts.

In a sixth embodiment of this invention, FIGS. 8-12 show an ergonomic platform truck 170 which has a bin 180 and a platform assembly 280 which includes platform 200. The bin 180, in this embodiment, is a box shown best in FIG. 8, with a base 181, a top 182 and a front 183. The top 182, in this embodiment, is formed of three cross members 198, 199, 203. Both the top and front 182, 183 are open. By open it is meant that there is no portion of the ergonomic platform truck 170 which would impede the placement or removal of parts 172 from the top or front 182, 183. Rigidly attached to the base 181 and shown best in FIGS. 8–9, is side framing 269 and four columns 184, 185, 186, 187 which are vertically disposed. The ergonomic platform trucks 170 of this invention are stackable. By stackable it is meant that platform trucks, which could include any number of ergonomic platform trucks 170, can be stacked on top of each other for storage or other purposes. In this embodiment stacking pins 188 are used but it should be noted that any means chosen with sound engineering judgement such as equipping the four columns 184, 185, 186, 187 with joinable angle iron could also be used. The stacking pins 188 are mounted to the top while stacking slots 189 are formed in the bottom of each column 184, 185, 186, 187. The stacking slots 189 are made to receive the stacking pins (similar to 188) of another associated platform truck (not shown).

With reference to FIGS. 8–11, towmoter brackets 190 for receiving the forks of an associated towmoter (not shown) are rigidly attached to the base 181. Also attached to the base 181 are casters. In this preferred embodiment, two casters 191 are swivelly mounted and two other casters 192 are rigidly mounted to the base 181 via caster mounting plates 193. Guide rods 194, 195, 196, 197 are vertically disposed on the bin 180 for reasons which will be explained below.

Figure 11:
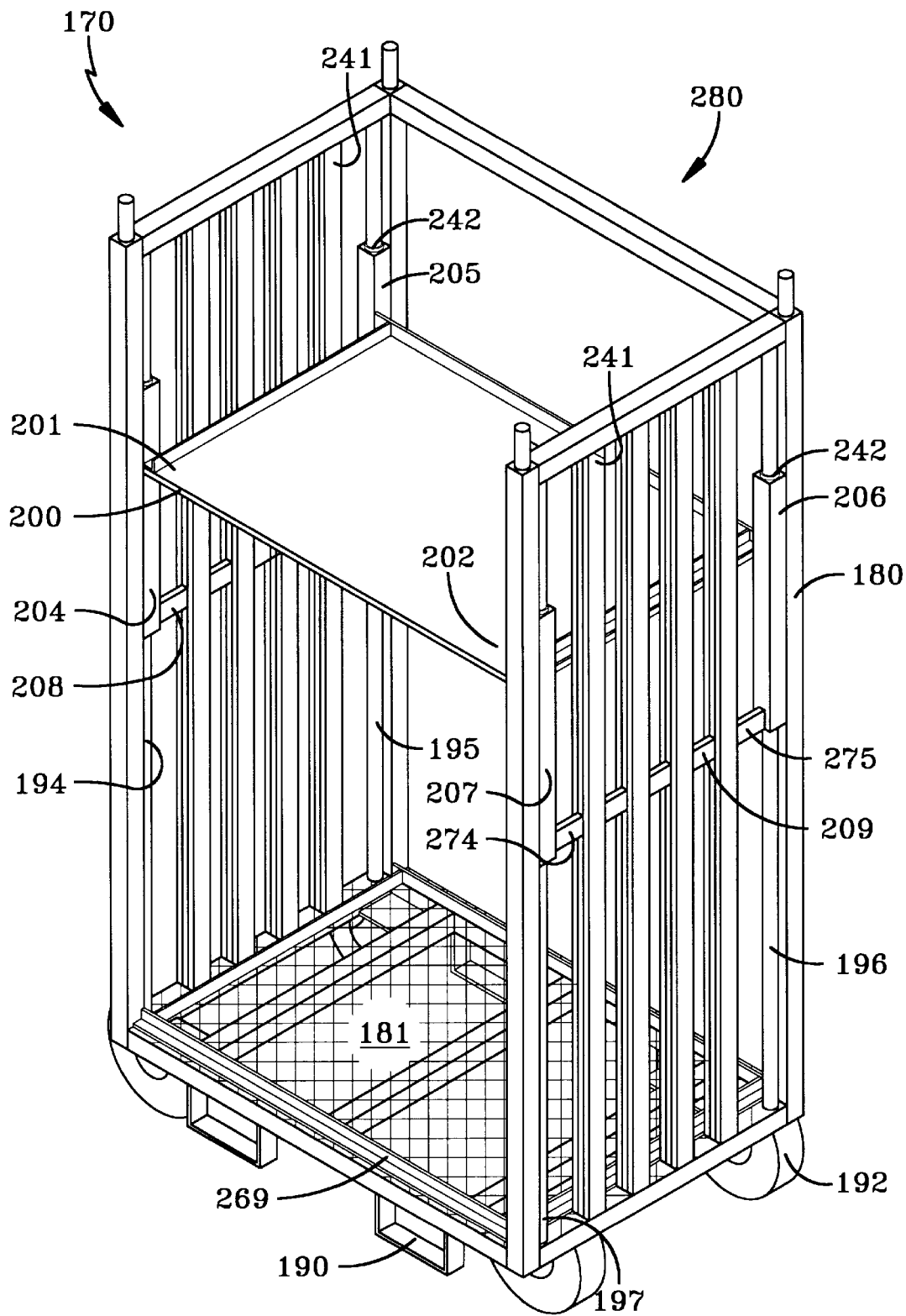
FIG. 11 is a perspective side view of the sixth embodiment shown without parts.

With reference now to FIGS. 10–11, 19–20, 26, platform assembly 280 is vertically moveable within the bin 180 and includes platform 200 which is generally horizontal and planar and is constructed so as to hold parts thereon, such as parts 172 (shown in FIGS. 8–9). It should be noted that the parts can be of any type used with sound engineering judgement. The platform assembly 280 has first and second sides 201, 202 having first and second spring support brackets 208, 209 respectively. The purpose of the spring support brackets 208, 209 will be explained below. The platform assembly 280 also has, as best seen in FIG. 11, deck guides 204, 205, 206, 207 which are vertically disposed. Within each deck guide 204, 205, 206, 207, at the top and bottom is a linear bearing 242. In this preferred embodiment each linear bearing 242 has a first end 250 with a lip portion 252 and a second end 251. Lip portions 252 remain external to deck guides 204, 205, 206, 207, while second ends 251 are received within deck guides 204, 205, 206, 207. The linear bearings 242 and thus the deck guides 204, 205, 206, 207 receive and are vertically moveable along the guide rods 194, 195, 196, 197 respectively. The linear bearings 242 assure that the platform assembly 280 moves smoothly along guide rods 194, 195, 196, 197 with no binding. The linear bearings 242 also eliminate any tipping factor. The deck guides 204, 205, are rigidly attached to the first side 201 of the platform assembly 280 while deck guides 206, 207 are likewise rigidly attached to the second side 202. Second spring support bracket 209 has first and second ends 274, 275 rigidly connected to deck guides 207, 206 respectively. First spring support bracket 208 is similarly rigidly connected to deck guides 204, 205. All rigid connections in this embodiment are welds but other connecting means chosen with sound engineering judgment would also be acceptable for this invention. Though the platform 200 can be customized to any required dimensions, it has been learned that to minimize the stress put on an operators back when lifting parts (172 in FIGS. 8–9), it is best to maintain the width W1 of the platform 200 under 30 inches (76.2 centimeters).

Figure 27:
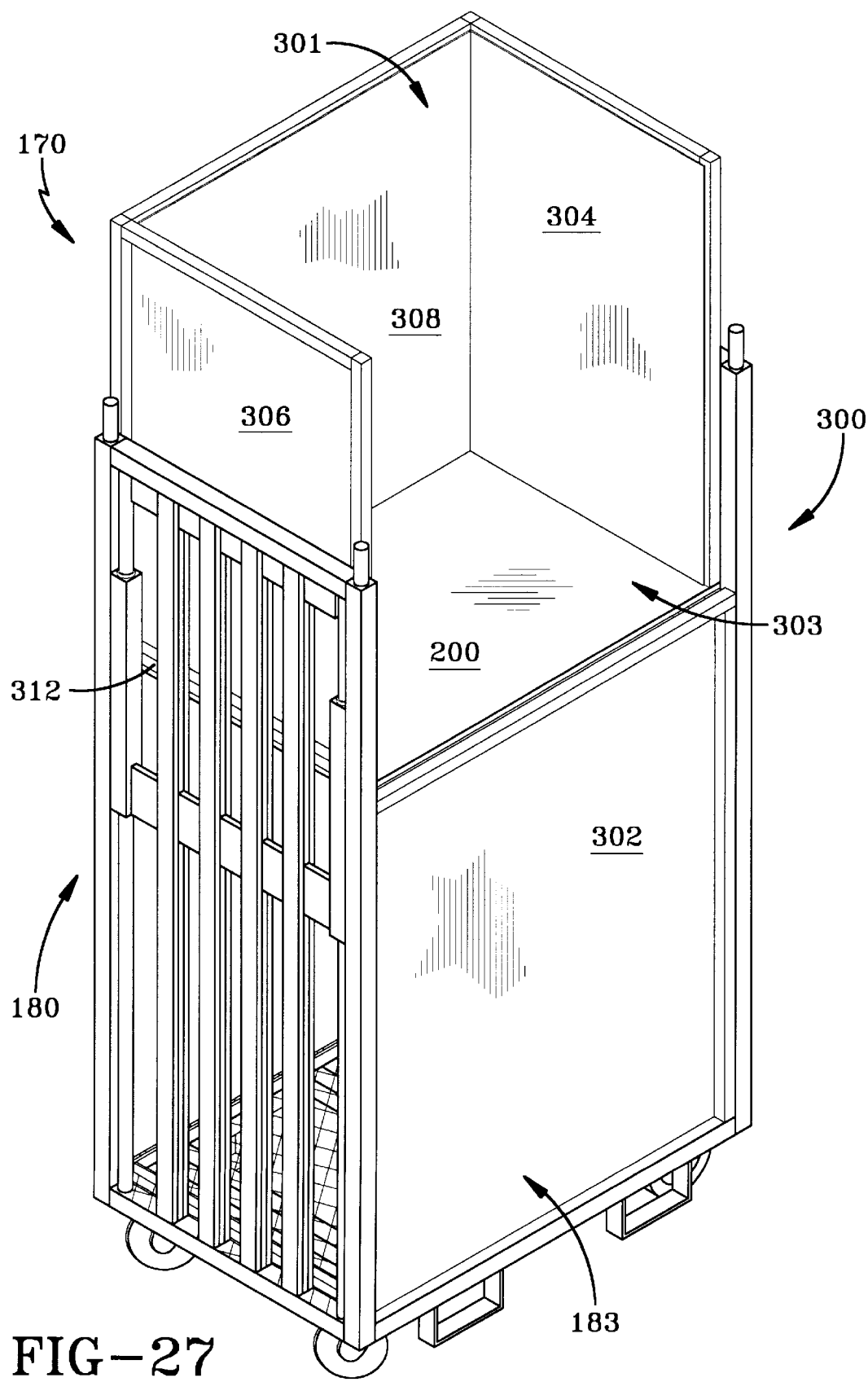
FIG. 27 is a perspective front view of an ergonomic platform truck having a bucket for use in holding loose parts.

With reference now to FIG. 8–9, 13–14 and 27, parts may be held on the platform 200 in various ways. As seen in FIGS. 8 and 9, sometimes the parts, such as parts 172, are sized and shaped such that they will remain on the platform 200 with no additional containing means. Other times, as seen in FIGS. 13 and 14, the parts are placed inside containers, such as laden containers 176. It may also be desirable to hold loose parts that are not sized or shaped to remain on the platform 200 without using containers. Thus, as seen in FIG. 27, the ergonomic platform truck 170 may be equipped with a bucket 300. The bucket 300 is ideal for use with parts that are spherical in shape such as golf balls (not shown). Of course the bucket 300 could be used with any parts chosen with sound engineering judgement. The bucket 300 is vertically disposed around the perimeter of the platform 200 and preferably includes first, second, third and fourth walls 302, 304, 306, 308. In this preferred embodiment first wall 302 is rigidly connected to the front 183 of the bin 180. Thus, in this case, the front 183 of the bin 180 is not open. Second, third and fourth walls 304, 306, 308, are rigidly connected to the right, left and back sides 311, 312, 313 respectively of the platform 200. When the platform 200 is at it lowest point (not shown) the bucket 300 forms a box having a bottom (platform 200), four sides (first, second, third and fourth walls 302, 304, 306, 308) and a top 301 that is open. As the platform 200 is raised, the front 303 of the bucket 300 gradually opens. When the platform 200 reaches its maximum height, as shown in FIG. 27, the front 303 of the bucket 300 is completely open. Thus, the front 303 of bucket 300 is selectively open or closed depending on the vertical position of platform 200.

Figure 12:
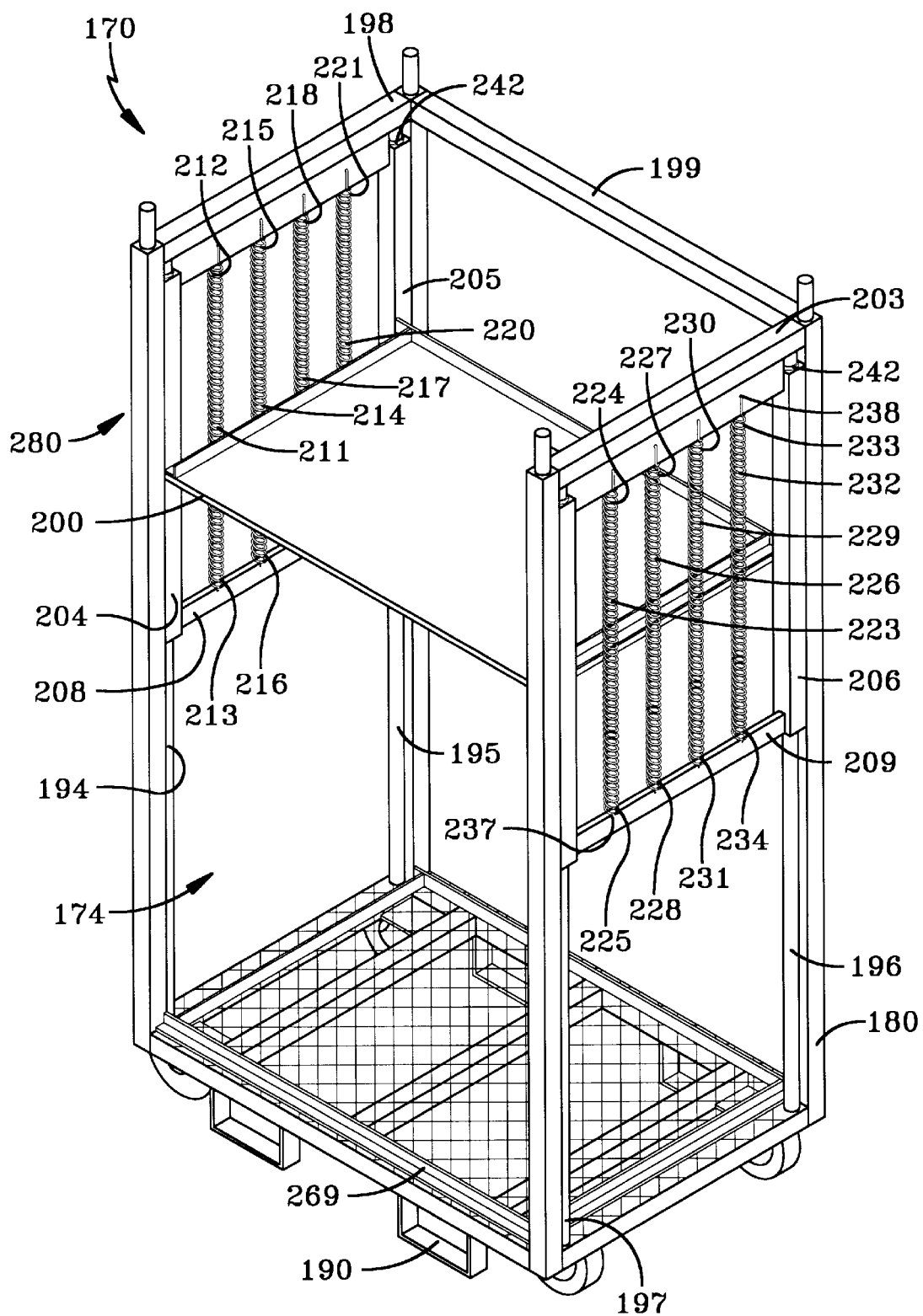
FIG. 12 is a perspective side view of the sixth embodiment showing the springs without spring covers.

With reference now to FIGS. 12–14, springs 211, 214, 217, 220, 223, 226, 229, 232 are used to lift platform assembly 280 within the bin 180. Springs 211, 214, 217, 220, 223, 226, 229, 232 are disposed to the side of and externally to the platform 200 so that they are not positioned either directly above or directly below the platform 200. For this reason, there is an open storage space 174 below the platform 200 which includes the entire space between the platform 200 and the base 181. The open storage space 174 could be used for storage or other uses. One efficient use of the open storage space 174 is for dunnage such as empty parts containers. In a typical application, shown in FIG. 13, the ergonomic platform truck 170 would come to the operator full of laden containers 176 which contain parts to be used by the operator. The weight of the parts in the laden containers 176 hold the platform 200 at a level which is a distance X1 from the top of the ergonomic platform truck 170 so that the top most laden containers 176 are at the preferred height for the operator. As the laden containers 176 are emptied of their parts and removed, the weight on the platform 200 is lessened and the springs 211, 214, 217, 220, 223, 226, 229, 232 raise platform 200 so that it maintains the preferred height for the operator. As the platform 200 raises, open storage space 174 grows larger. Thus, it can be easily understood that open storage space 174 is an ideal place to store emptied containers 177 because just as emptied containers 177 become available, additional open storage space 174 also becomes available. FIG. 14 shows the ergonomic platform truck 170 holding laden containers 176 on its platform 200 and holding emptied containers 177 in its open storage space 174. It should be noted that the platform 200 is now at a distance X2 (where X2 is significantly smaller than X1) from the top of the ergonomic platform truck 170 so that the laden containers 176 continue to be at the preferred height for the operator.

With reference to FIGS. 15–16, another way to store emptied containers 177 is by mounting a storage assembly 178 to the side of the ergonomic platform truck 210 thus providing an open storage space 179. This storage assembly 178 can be made in any manner and of any material chosen with sound engineering judgement but in this embodiment it is made of steel members 175 fixedly attached to the bin 286. Of course a storage assembly 178 could just as easily be mounted to the other side, both sides, or the back of the ergonomic platform truck 210 as well. FIG. 16 shows the ergonomic platform truck 210 holding laden containers 176 on its platform 200 and holding emptied containers 177 in its open storage space 179. It may also be desirable to cover the storage assembly 178 with a cover 239 as shown in FIG. 15.

Figure 17:
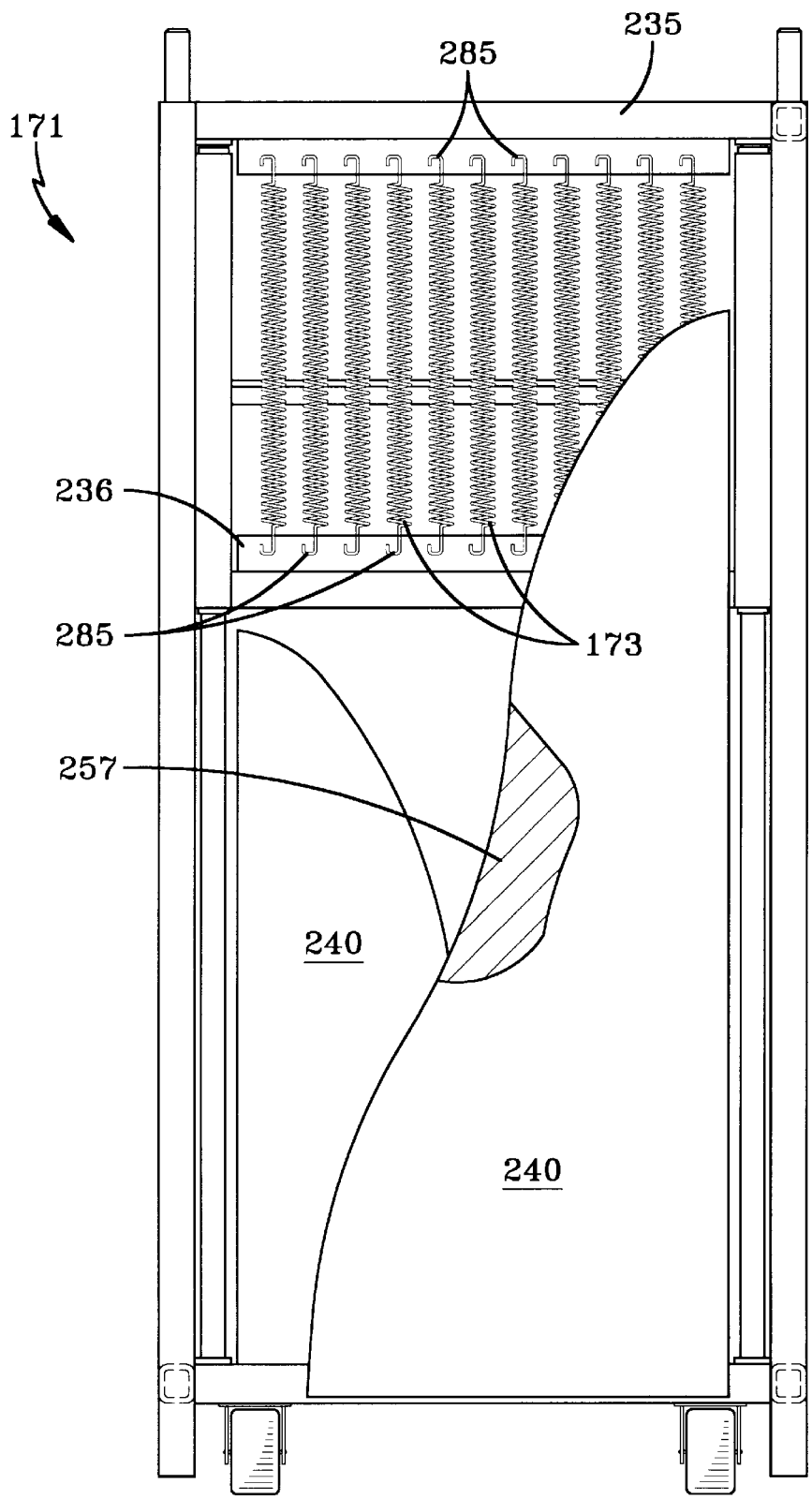
FIG. 17 is a side view of an ergonomic platform truck showing spring slots and spring covers.
Figure 21:
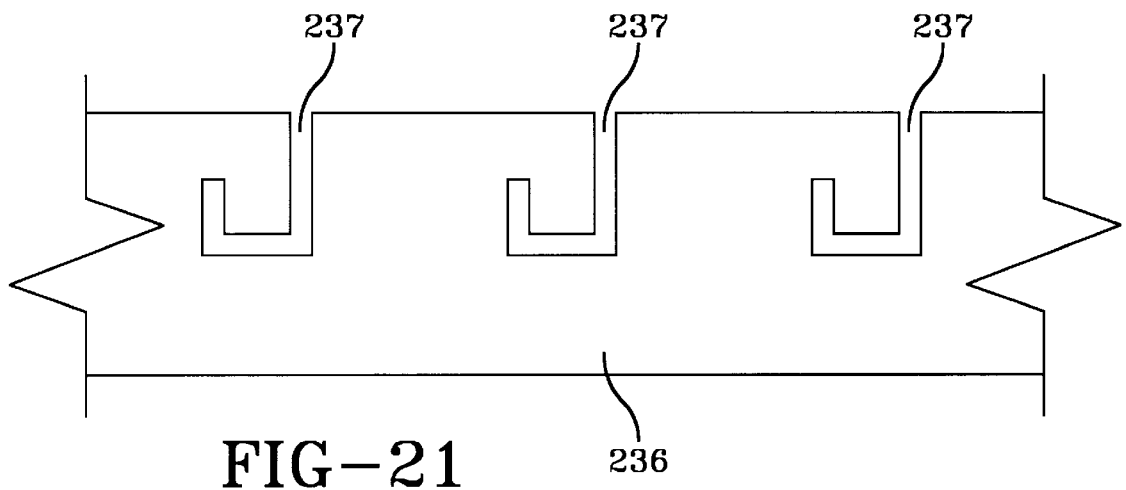
FIG. 21 is a side cut-a-way close-up view of a spring support bracket showing spring slots.
Figure 22:
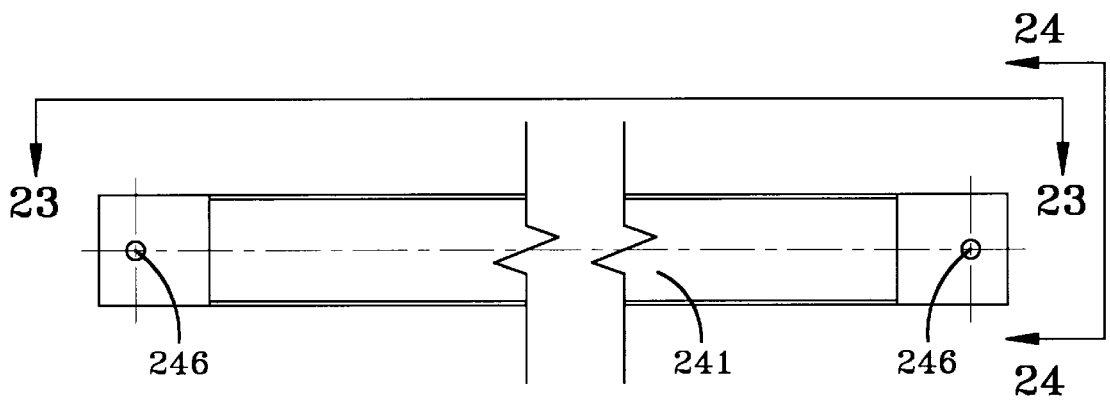
FIG. 22 is a bottom cut-a-way view of a spring cover used in this invention.
Figure 23:
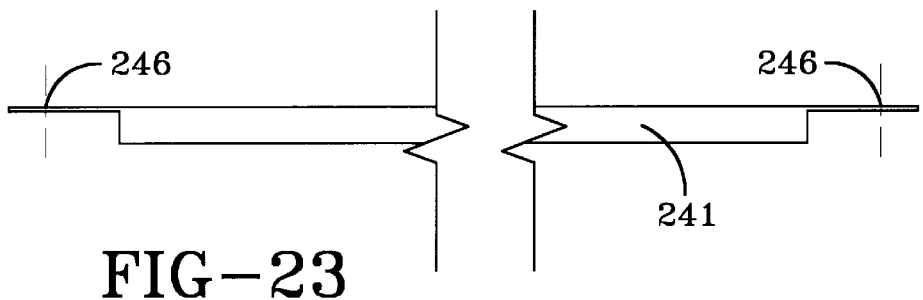
FIG. 23 is a side cut-a-way view taken along the line 23—23 of FIG. 22.

With reference now to FIGS. 12, 17, 21, 26, springs 223, 226, 229, 232 have second ends 225, 228, 231, 234 respectively, operatively connected to the second spring support bracket 209 and first ends 224, 227, 230, 233 respectively, operatively connected to the cross member 203 directly above the second spring support bracket 209. The connection to the second spring support bracket 209 and the cross member 203 can be of any type chosen with sound engineering judgement but in this embodiment is by means of holes 237, 238 respectively. FIG. 17 shows another but similar embodiment wherein the ergonomic platform truck 171 has springs 173 which are connected to cross member 235 and spring support bracket 236 by means of spring slots 285. The spring slots 285 are best seen in FIG. 21. Whether connected by holes 237, 238, by spring slots 285, or by other means, it is desirable to be able to selectively connect and disconnect individual springs 223, 226, 229, 232 or 173. In this way the overall spring strength can be adjusted to suit the need, i.e., to suit the weight of the parts to be placed on ergonomic platform truck 170 or 171. An efficient way to disengage a spring is to disconnect the second end 225 of spring 223, for example, from the second spring support bracket 209 while allowing the first end 224 to remain connected to cross member 203. In this way the spring 223 remains in place and can be reconnected to the second spring support bracket 209 when ever it is desirable to increase the overall spring strength.

With reference again to FIG. 12, springs 211, 214, 217, 220 are similarly operatively connected to the first spring support bracket 208 and the cross member 198 directly above the first spring support bracket 208. The springs 211, 214, 217, 220, 223, 226, 229, 232 which provide lifting means for the platform 200 so that it can move vertically along the guide rods 194, 195, 196, 197, can be of any type chosen with sound engineering judgement but in this embodiment are extension springs having spring constants chosen and matched to the weight of the parts 172 (shown in FIGS. 1 and 2). It should be noted that while eight springs were used in this embodiment, the exact number can and should be modified to best suit the engineering requirement.

Figure 24:
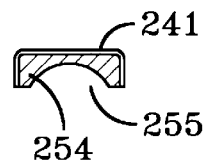
FIG. 24 is an end view taken along the line 24—24 of FIG. 22 showing the channel shape of the spring cover and the foam panel used to protect the springs.
Figure 25:
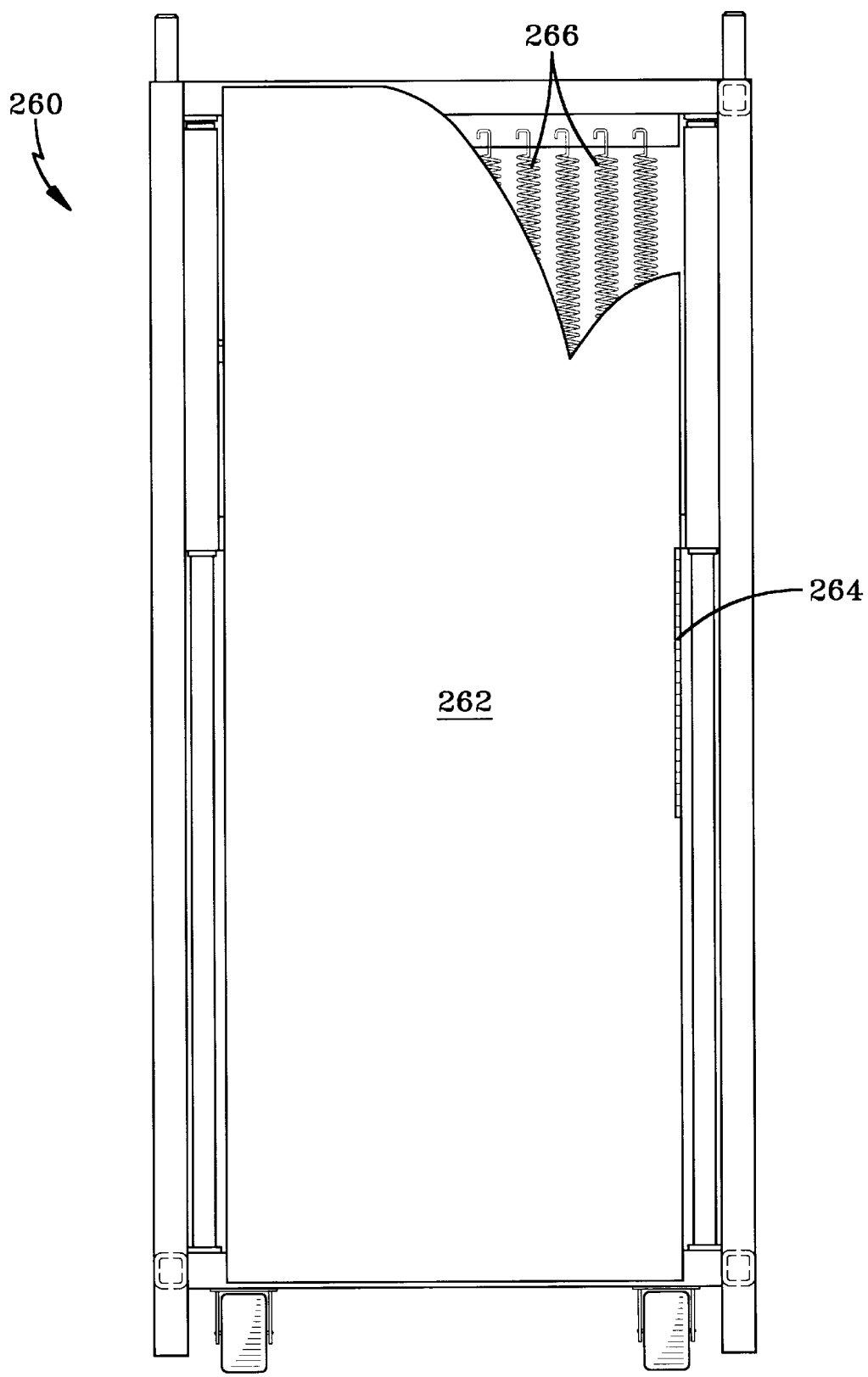
FIG. 25 is a side view of an ergonomic platform truck showing a door which covers the springs.
Figure 26:
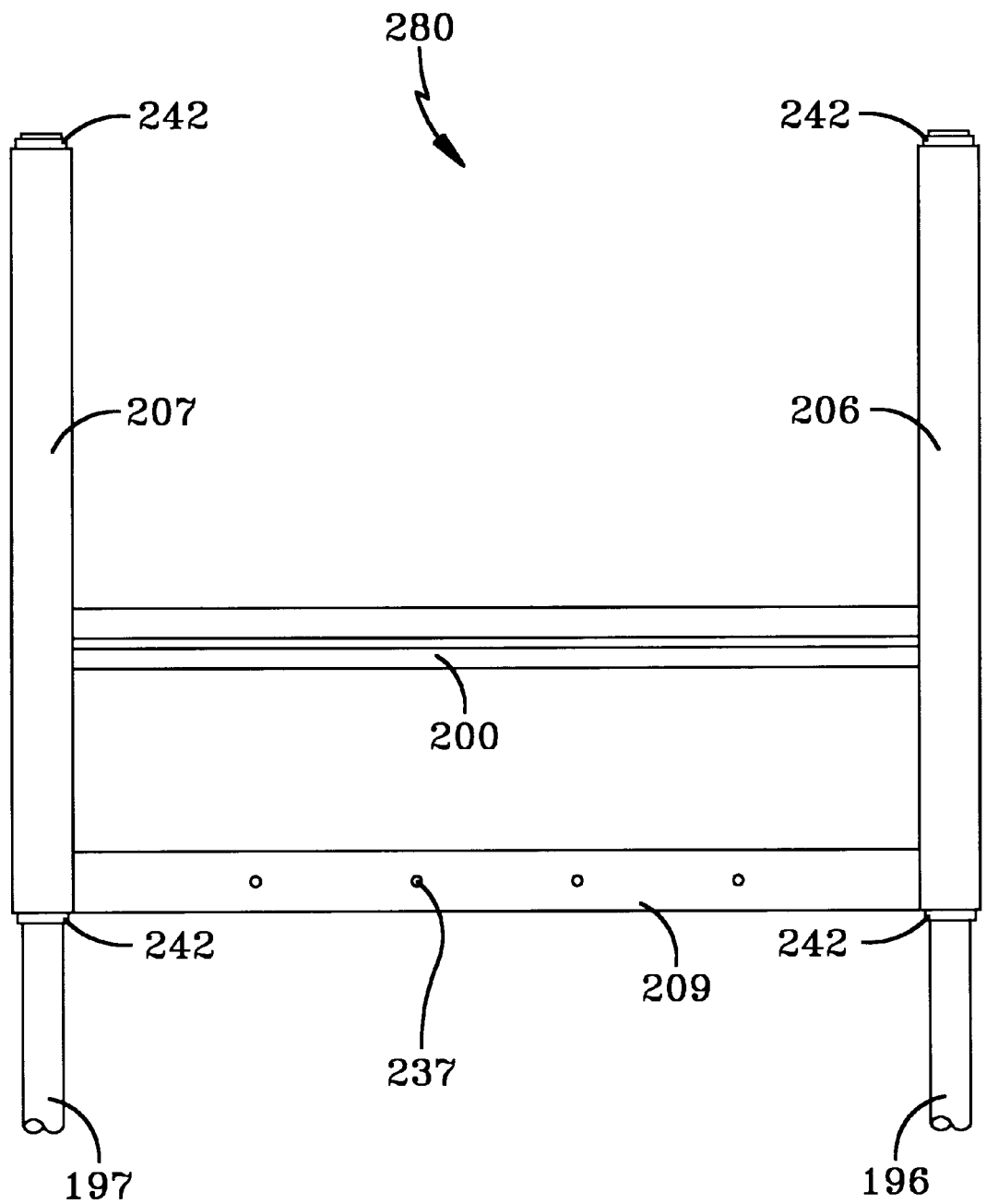
FIG. 26 is a side view of the platform assembly used in this invention.

With reference now to FIGS. 10–11, 17, 22–24, each spring (shown as 211, 214, 217, 220, 223, 226, 229, 232 in FIG. 12) is individually covered on the inside and on the outside by spring covers 241. In this embodiment spring covers 241 are channel-shaped and have openings 246 whereby screws (not shown) are used to attach the spring covers to the bin 180. Of course other shapes and attaching means chosen with sound engineering judgement are also possible. It may also be desirable, as shown in FIG. 24, to use spring protecting means such as foam panels 254 to protect the springs. The foam panels can be made of any material known in the art. Spring covers 241 do not fully surround the springs (shown as 211, 214, 217, 220, 223, 226, 229, 232 in FIG. 12) because first and second spring support brackets 208, 209 move between them as the platform assembly 280 is moved vertically. In an alternate embodiment, shown in FIG. 17, all the springs 173 on one side of ergonomic platform truck 171 are jointly covered on the inside and on the outside by spring covers 240. Once again it may be desirable to use spring protecting means such as foam panels 257 positioned within spring covers 240 to protect the springs 173. In an alternate design, shown in FIG. 25, an ergonomic platform truck 260 may utilize a door 262 that swings on a hinge 264 and performs the duty of a spring cover. Doors 262 make springs 266 very accessible for adjustment or maintenance.

Figure 18:
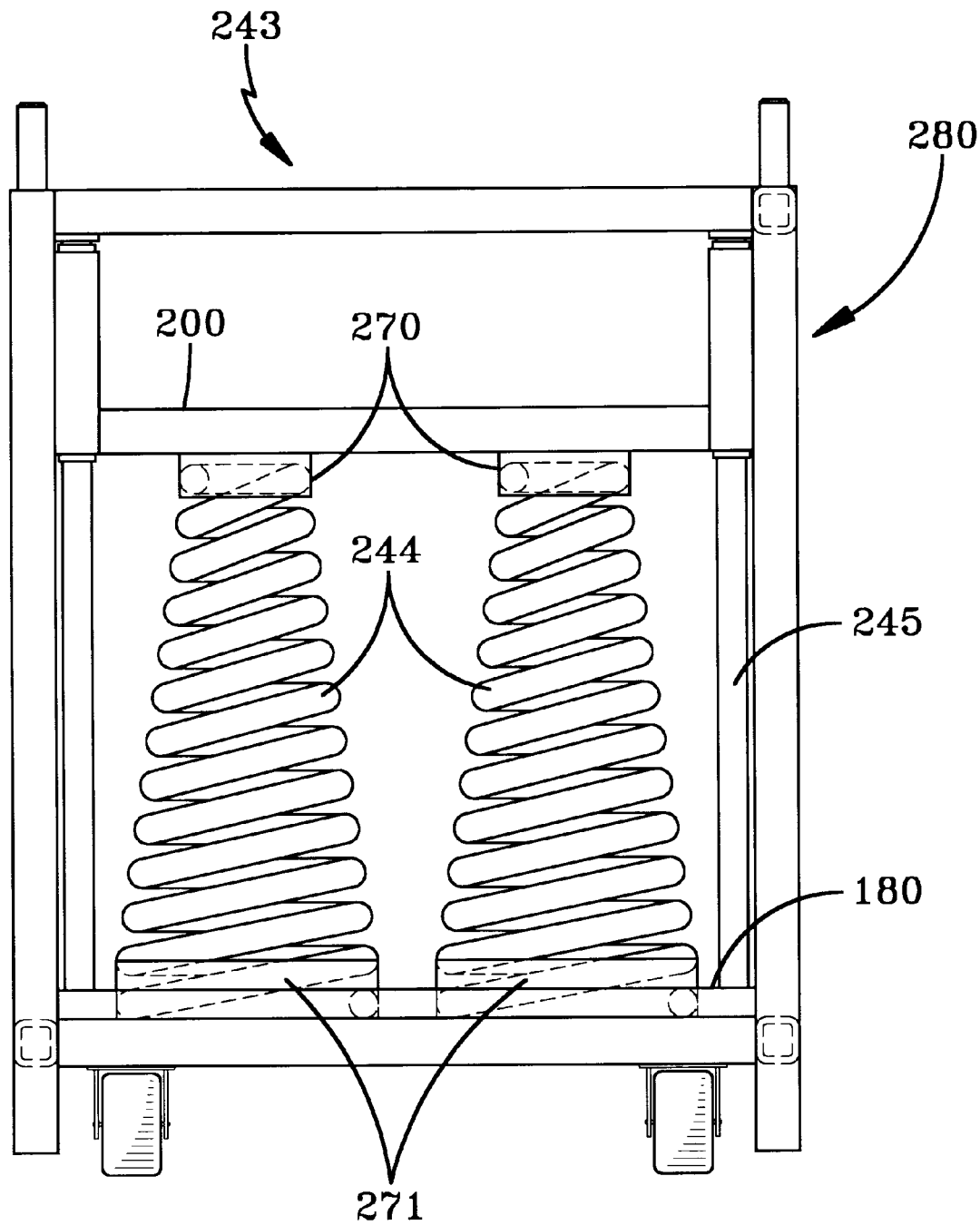
FIG. 18 is a side view of an ergonomic platform truck which uses conical springs to lift the platform assembly.
Figure 19:
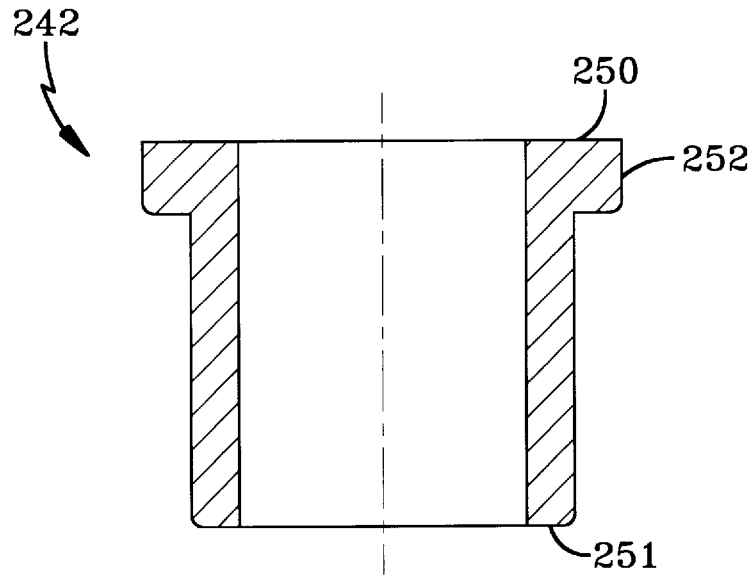
FIG. 19 is a sectional view taken along the line 19—19 of FIG. 20 showing the lip portion of the linear bearing.
Figure 20:
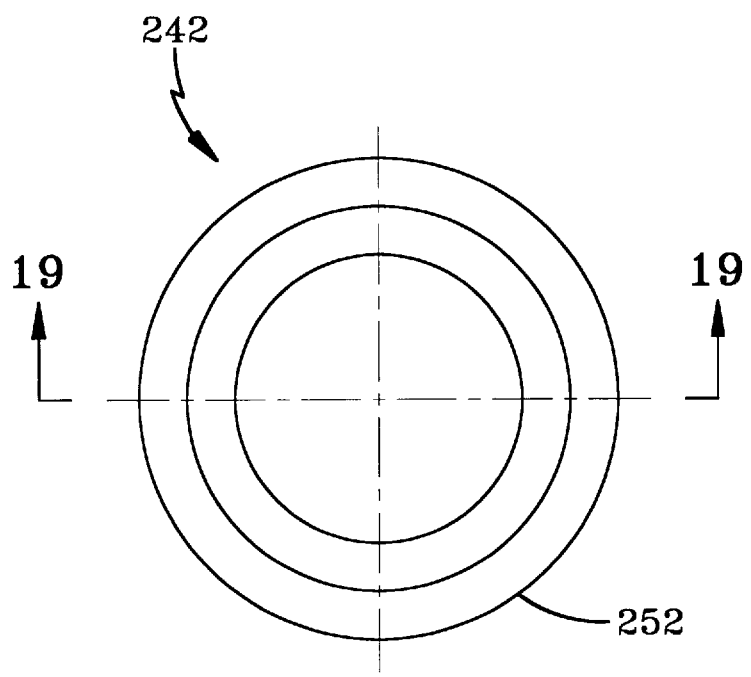
FIG. 20 is an end view of the linear bearing used in this invention.

With reference now to FIG. 18, an ergonomic platform truck 243 is shown having conical springs 244 to lift platform assembly 280. The conical springs 244 are operatively connected at one end to the bottom of platform 200 within upper clam shells 270 and at the other end to the base 180 within lower clam shells 271. The conical springs 244, which provide lifting means for the platform assembly 280 so that it can move vertically along the guide rods 245, can be of any type commercially available chosen with sound engineering judgment having spring constants matched to the weight of the parts. It should be noted that while two springs were used in this embodiment, the exact number can and should be modified to best suit the engineering requirement.

All of the embodiments of the present invention can be stationary or portable. All of the embodiments of the present invention can be constructed to fit any size parts bin 12, or can be a stand-alone unit, and vertically adjust to any type (e.g., size, weight, etc.) of part.

The materials used to construct the present invention may be strong, lightweight, long-lasting, economic, and ergonomic. For example, polyethylene (which will not rust, mildew or deteriorate, is easy to clean, and is impervious to moisture, oils, and most chemical agents) may be used.

The invention has been described with reference to a preferred embodiment, obviously, modifications and alternations will occur to others upon a reading and understanding of the this specification. It is intended to include all such modifications and alterations in so far as they come within the scope of the appended claims or the equivalents thereof.

Having thus described the invention.

What is claimed is:

1. A method of using a platform truck comprising the steps of:
   providing a first platform truck that includes a bin having a base and first and second vertically disposed guide rods, a platform assembly including a platform and first and second deck guides vertically disposed for receiving the first and second guide rods respectively, and lifting means for lifting the platform assembly within the bin, the lifting means being disposed external to the platform, said first and second guide rods being vertically disposed on first and second sides of the platform respectively;
   providing the first and second deck guides each with first and second linear bearings for receiving the first and second guide rods respectively;
   placing at least one item on the platform assembly;
   vertically adjusting the height of the platform in a first direction including the step of eliminating tipping and binding in the platform assembly;

removing the at least one item from the platform; and vertically adjusting the height of the platform in a second direction.

2. The method of claim 1 further comprising the steps of:

providing the lifting means with a first spring having a first end operatively connected to a first side of the bin and a second end operatively connected to a first side of the platform assembly and a second spring having a first end operatively connected to a second side of the bin and a second end operatively connected to a second side of the platform assembly; and, wherein the step of vertically adjusting the height of the platform in a first direction further comprises the step of extending the first and second springs.

3. The method of claim 2 wherein, the step of vertically adjusting the height of the platform in a second direction, comprises the steps of:

contracting the first and second springs;

eliminating tipping and binding in the platform assembly; and, increasing the size of an open storage space under the platform.

4. A method of using a platform truck comprising the steps of:

providing a first platform truck that includes a bin having a base and a first guide rod vertically disposed, a platform assembly including a platform and a first deck guide vertically disposed for receiving the first guide rod, and lifting means for lifting the platform assembly within the bin, the lifting means being disposed external to the platform;

providing the first platform truck with at least one stacking pin;

placing at least one item on the platform assembly;

vertically adjusting the height of the platform in a first direction;

removing the at least one item from the platform;

vertically adjusting the height of the platform in a second direction;

providing a second platform truck that includes a bin having a base and a first guide rod vertically disposed, a platform assembly including a platform and a first deck guide vertically disposed for receiving the first guide rod, lifting means for lifting the platform assembly within the bin, and at least one stacking slot; and, stacking the second platform truck onto the first platform truck such that the at least one stacking slot receives the at least one stacking pin.

5. A method of using a platform truck comprising the steps of:

providing a first platform truck that includes a bin having a base and a first guide rod vertically disposed, a platform assembly including a platform and a first deck guide vertically disposed for receiving the first guide rod, and lifting means for lifting the platform assembly within the bin, the lifting means being disposed external to the platform;

providing the first platform truck with a bucket having first, second, third, and fourth walls, the first wall being rigidly connected to the base of the bin on a front side of the bin, the second, third, and fourth walls being rigidly connected to right, left, and back sides of the platform;

placing at least one item on the platform assembly;

vertically adjusting the height of the platform in a first direction;

removing the at least one item from the platform;

vertically adjusting the height of the platform in a second direction including the step of opening the front of the bucket.

* * * * *